United States Patent [19]

Hudelmaier et al.

[11] 4,093,085

[45] June 6, 1978

[54] APPARATUS FOR MAKING READY-MIXED CONCRETE

[75] Inventors: Gerhard Hudelmaier, Ulm, Donau; Anton Rudolf, Neu-Ulm, both of Germany

[73] Assignee: Ingrid Hudelmaier, Ulm, Donau, Germany

[21] Appl. No.: 776,585

[22] Filed: Mar. 11, 1977

[30] Foreign Application Priority Data

Mar. 16, 1976 Germany .............................. 2611055

[51] Int. Cl.$^2$ .................................................. B65G 3/20

[52] U.S. Cl. ................................ 214/16 R; 222/168.5; 366/33

[58] Field of Search ............. 214/16 R; 259/154, 161, 259/164; 222/144, 168.5

[56] References Cited

U.S. PATENT DOCUMENTS

| | | | |
|---|---|---|---|
| 1,858,099 | 5/1932 | Massengale | 222/144 |
| 2,219,226 | 10/1940 | Gerber | 214/16 R X |
| 3,095,097 | 6/1963 | Mellow | 214/16 R X |

*Primary Examiner*—Robert G. Sheridan
*Attorney, Agent, or Firm*—James E. Nilles

[57] ABSTRACT

This invention relates to apparatus for making ready-mixed concrete, comprising a plurality of transfer containers divided into separate chambers and adapted to be moved along a closed path to at least one filling station and a plurality of emptying or waiting stations, respectively, for temporarily containing cement, filling materials and possibly, water separately from one another and for transferring these materials to concrete mixer trucks, particularly to mixer trucks provided with positive mixing tools.

9 Claims, 8 Drawing Figures

APPARATUS FOR MAKING READY-MIXED CONCRETE

BACKGROUND OF THE INVENTION

Apparatus such as shown in U.S. Pat. Ser. No. 545,159, filed Jan. 29, 1975, now abandoned, offers the advantage that the materials for making concrete may be temporarily stored in measured quantities without being mixed, however, and may then be transferred to a concrete mixer truck. Mixing of the components and thus making of the concrete occurs then only in the mixer truck. This results in the capacity of the installation being no longer determined, as formerly, by a positive mixer forming part of the installation. Rather it is possible to provide any suitable number of transfer containers, with their contents being transferred to concrete mixer trucks simultaneously or consecutively within a short time period.

In the known apparatus, the transfer containers are stationary and may be filled by a mobile filling device, or they are moved along a closed trapezoidal path including a filling station supplied by a stationary filling device.

SUMMARY OF THE INVENTION

It is the object of the invention to further develop the last-named construction of the known apparatus in such a manner that the transfer containers may be moved to the filling, waiting and emptying stations rapidly and by the aid of simple mechanical means.

For attaining this object, the invention provides that the transfer containers are supported by a revolving carrier structure adapted to be indexed by angular amounts corresponding to the distance between stations for moving said transfer containers step by step along a circular path.

In the apparatus according to the invention, the transfer containers are supported by a revolving carrier structure to move along a circular path. In order to get from one station to the next, all that is required is a revolving movement of the carrier structure, which may be brought about in a mechanically simple manner and within a minimum of time. Movement of the transfer containers along a circular path further results in a space-saving construction of the overall apparatus, with the posibility of advantageously disposing or mounting of the other apparatus components.

In an advantageous embodiment the invention provides that the carrier structure consists of a non-revolving tower and a pair of crossed arms rotatably mounted on the upper end of said tower and carrying said transfer containers at their ends. With this construction it is possible to employ conventional structural elements as usually employed in the construction of rotary head tower cranes, particularly a rotary ball joint and corresponding driving elements.

In another embodiment the invention provides that the carrier structure consists of a portal structure rotatably supported by a central mounting column, with the transfer containers being carried by the horizontal bridge portions of said portal structure. This construction offers the advantage that the individual components of the carrier structure may be lighter and smaller dimensioned thanks to the multiple ground support of the portal structure.

The invention preferably provides that the filling station has associated therewith an elevator for the filler materials located outside the path of the transfer containers. With this construction, the interior of the path followed by the transfer containers, particularly the tower, or the mounting column, respectively, is kept free for locating other components. It is thus possible to locate an operator's cab in the tower or mounting column, respectively. This provides optimum conditions for supervising and controlling filling and emptying operations.

The employ of a tower or of a non-revolving mounting column permits actuating devices for the transfer container outlets to be carried by the tower, or column, respectively. This results in the possibility of avoiding the employ of slip rings and the like for transmitting electric power, pressurized air or pressurized oil to the revolving components.

If outside the path of the transfer containers there is no space available for an elevator for the filler materials, the filling station may have associated therewith an elevator for the filler materials extending through the interior of the tower, or of the non-revolving column, respectively.

If it is desired to selectively produce ready-mixed concrete in the apparatus itself, some of the transfer containers may be replaced by a positive concrete mixer, from which the ready-mixed concrete may then be filled into transport vehicles.

DESCRIPTION OF A PREFERRED EMBODIMENT

Figure 1:
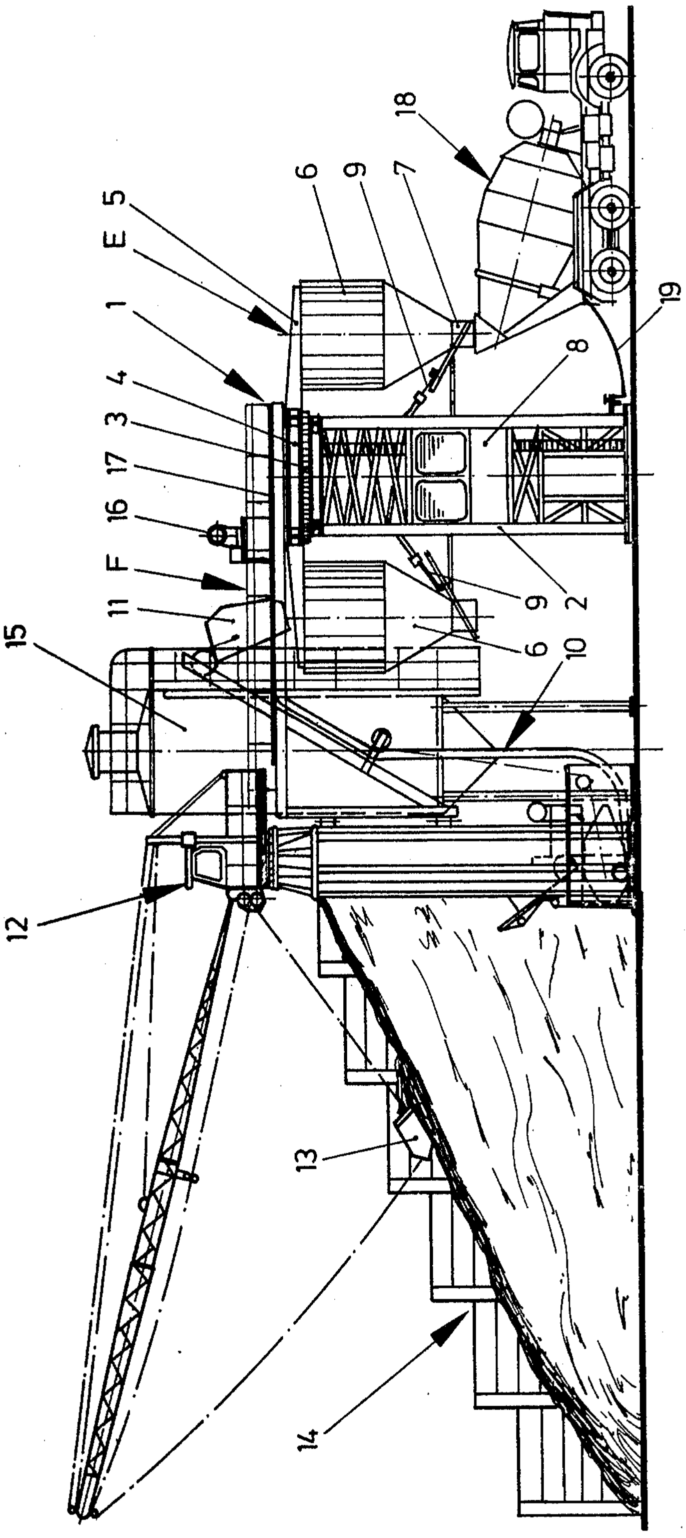
FIG. 1 shows a lateral view.
Figure 2:
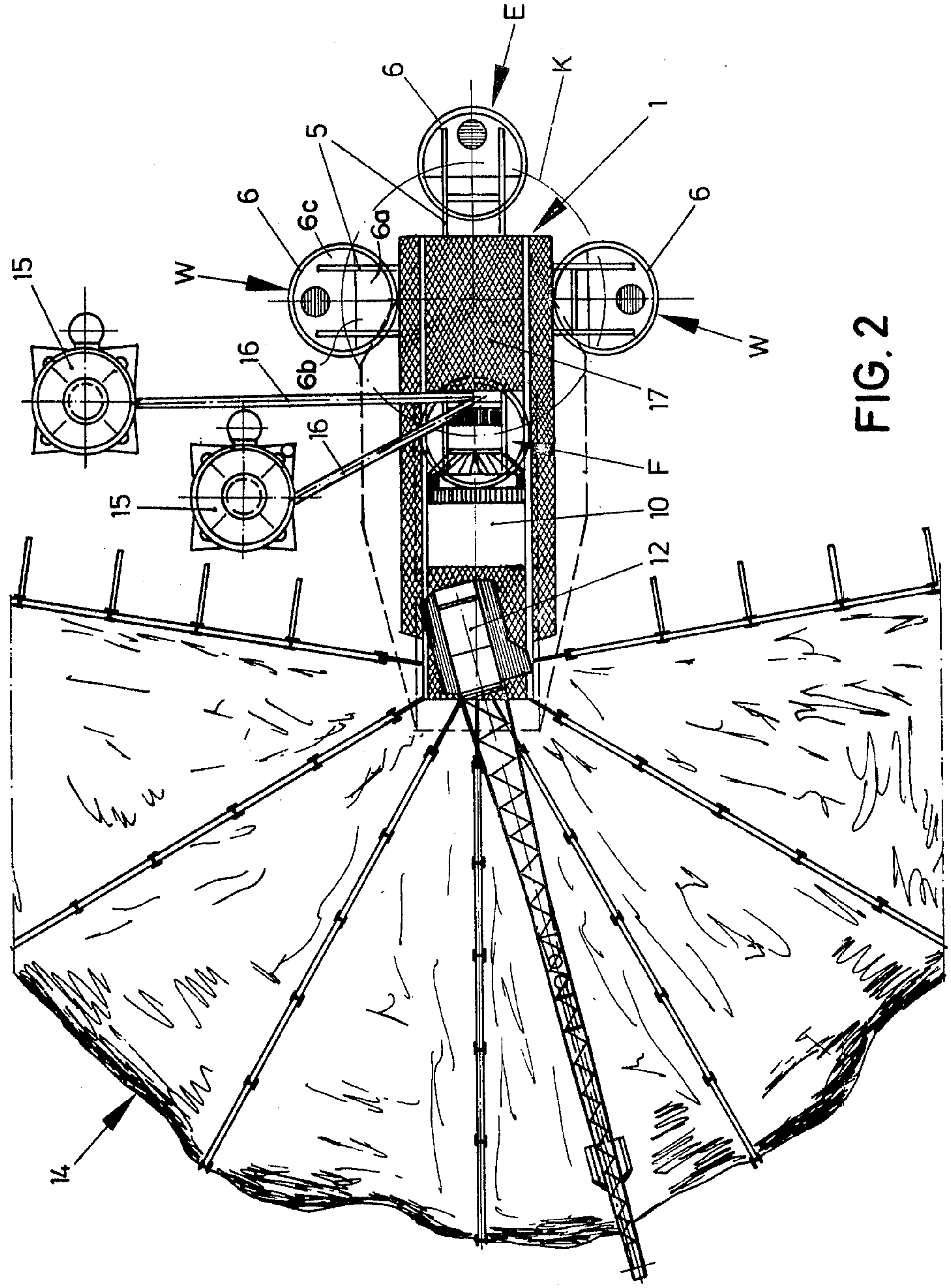
FIG. 2 shows a diagrammatic top plan view of a first embodiment of an apparatus for making ready-mixed concrete according to the invention.

The apparatus for making ready-mixed concrete as shown in FIGS. 1 and 2 comprises a carrier structure 1 as its principal portion. The carrier structure 1 has a central tower 2 non-rotatably supported on the ground. At its upper end, tower 2 carries a rotatable drive means 3 similar to that of a rotatable-head tower crane. Drive means 3 rotatably supports on tower 2 an arm cross 4 having radial arms 5 extending at equal angular intervals. In the embodiment shown, there are provided four arms 5 at 90° angular intervals. Each arm 5 carries a transfer container 6 divided into three or more separate chambers as described in detail in said U.S. Ser No. 545,159. As FIG. 2 shows, the transfer containers 6 include separate chambers designated *6a*, *6b*, and *6c* for holding water, cement, and filler materials, respectively, for example. Each transfer container 6 has an outlet 7 at its lower end.

Located within tower 2 is an operator's cab 8 from where the movements of the arm cross 4 can be controlled. Actuating elements 9 located on tower 2 further permit transfer container outlets 7 to be opened and closed from operator's cab 8. The actuating elements may be electrically, hydraulically or pneumatically operated driving elements for moving the closing flaps or closing dampers in the container outlets to their closed and opened positions, respectively.

By stepwise indexing arm cross 4 by 90° steps, the transfer containers 6 may be moved along a circular path K from a filling station F to an emptying station E and to a pair of waiting stations W. In FIG. 1, the transfer containers located at the waiting stations W have been omitted for better understanding.

Associated with the filling station F is an elevator generally indicated by 10 and comprising an elevator bucket 11. Elevator 10 is located outside the circular path K of transfer containers 6 and extends from the lower end of a dragline apparatus 12 to above the filling station F. The dragline apparatus 12 has a dragline bucket 13 for transferring the filler materials stored in a conventional manner in a sectorized storage space 14 to elevator bucket 11, to be transported by the latter to a transfer container 6 then located at the filling station.

Likewise outside circular path K there are provided stationary cement bunkers 15 communicating with the filling station through transfer conduits 16. A bridge 17 connecting the upper end ot tower 2 with the dragline apparatus 12 permits the filling process to be observed.

After a transfer container 6 at filling station F has been filled with filler materials and cement, the arm cross 4 is indexed by 90°, so that the respective transfer container 6 is moved to a waiting station W. At this position, the cement and filler materials may be stored for a nearly indefinite period of time, since the materials are contained in separate chambers. Indexing the arm cross 4 by a further 90° increment brings the respective transfer container 6 to emptying station E. At this station, the cement and filler materials may be simultaneously transferred to a concrete mixer truck 18. Water is simultaneously fed to truck 18 through line 19. Ready-mixing of the concrete is then accomplished in the rotating drum of the concrete mixer truck 18. This is preferably achieved by the employ of a concrete mixer truck provided with a positive mixing tool in addition to conveying elements supported by the interior wall of the mixing drum. A concrete mixer truck of this type is described in detail in said U.S. Ser. No. 545,159 and also in U.S. Pat. No. 3,933.341 issued Jan. 20, 1976.

The water may of course be stored in one of the chambers of the transfer container and transferred to the concrete mixer truck together with the cement and filler materials.

Further it is of course possible to transfer the materials contained in the transfer container to a concrete mixer truck at any of the four stations. These stations are so configured and located that a concrete mixer truck may be driven underneath a transfer container at any station. In the shown embodiment it is thus possible to fill a maximum of four concrete mixer trucks simultaneously.

Figure 3:
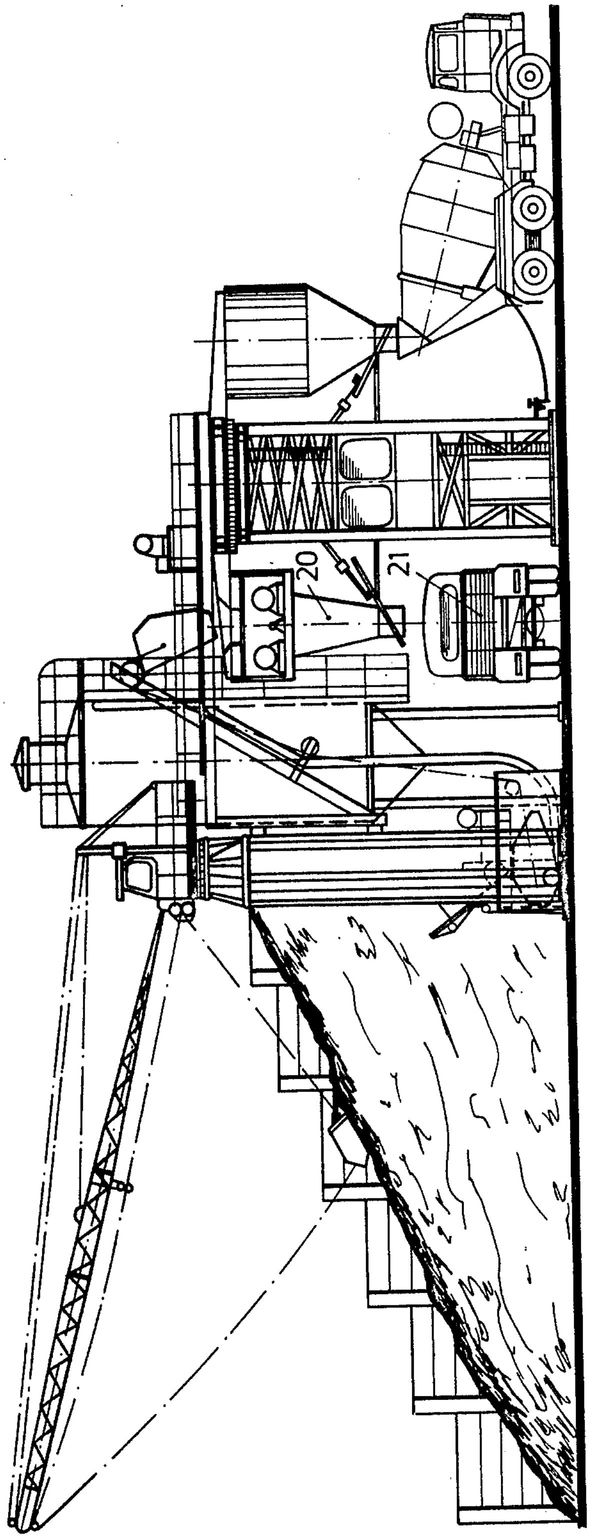
FIG. 3 shows a modification of FIG. 1, wherein a transfer container has been replaced by a positive mixer.

The embodiment of FIG. 3 differs from that shown in FIGS. 1 and 2 only in that one of the transfer containers 6 has been replaced by a positive concrete mixer 20. At the filling station, mixer 20 may be supplied with cement, filler materials and water and may then finish the ready-mixed concrete at the filling station or at any other station to which it has been indexed. The ready-mixed concrete may then be transferred to any suitable transport vehicle 21. In FIG. 3, a transport vehicle is shown as a normal open Truck driven underneath the positive mixer at the filling station to receive the ready-mixed concrete therefrom. Simultaneously therewith, a concrete mixer truck may be supplied with the individual concrete components at the emptying station to finish mixing of the concrete during its ride. With the exeption of the positive mixer 20, the components of the apparatus according to FIG. 3 are similar to those of the embodiment shown in FIGS. 1 and 2, and therefore they are not again described in detail and indicated by reference numerals.

Figure 4:
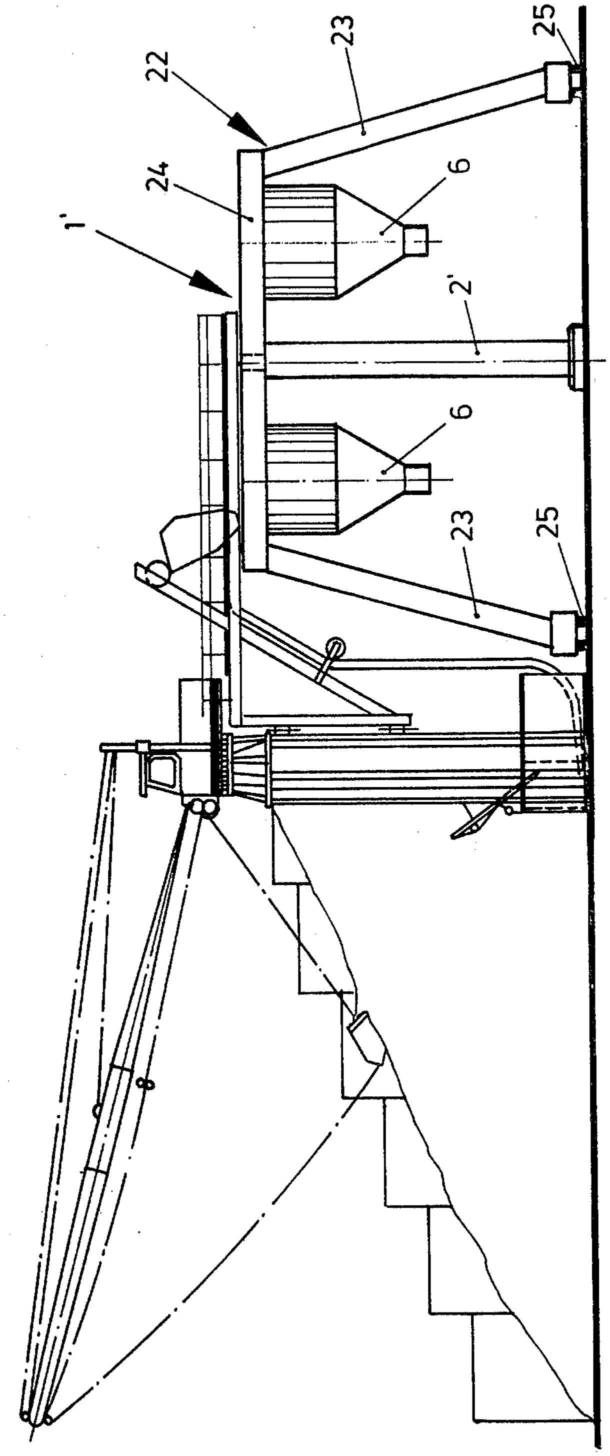
FIG. 4 shows a further diagrammatic lateral view of a different embodiment of the apparatus according to the invention, FIG. 5 a still further diagrammatic top plan view of the apparatus according to FIG. 4.
Figure 5:
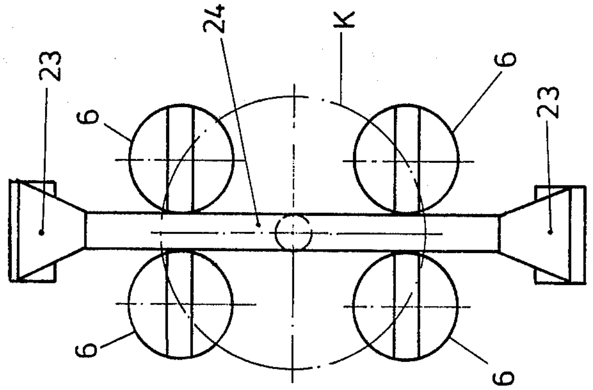

In the embodiment shown in FIGS. 4 and 5, the carrier structure is designed as a portal structure 1' comprising a central mounting column 2' and a portal gantry 22. Gantry 22 is supported on the ground through leg portions 23 and has a bridge portion 24 to the lateral sides of which transfer containers 6 are attached in pairs opposite one another. At their lower ends, leg portions 23 are provided with rollers 25, so that the portal gantry 22 may be rotated with the mounting column 2' as its center of rotation. Mounting column 22 may either be non-rotatable, in which case its upper end is connected to bridge portion 24 through a pivot bearing, or it may be rotatable about a pivot bearing at ground level, in which case it is rigidly connected to bridge portion 24. Revolving of the portal gantry causes transfer containers 6 to move along a circular path K to four different stations, the mutual distance of which, however, in this case equalling alternately 60° and 120°. For revolving the portal gantry, either the rollers 25 may be driven or a driving means is provided at the mounting column.

The remaining components of this embodiment are similar to those of the apparatus shown in FIGS. 1 and 2 and need therefore not be described again. For the sake of clarity, a number of these components has been omitted in FIGS. 4 and 5.

Figure 6:
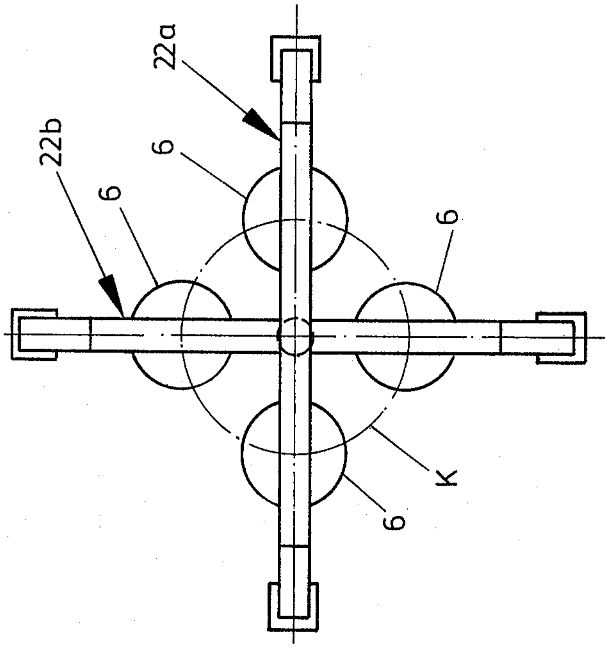
FIG. 6 shows a modification of the apparatus shown in FIGS. 4 and 5 in a top plan view corresponding to FIG. 5.

FIG. 6 shows a modification in which two intersecting portal gantries **22*a* and 22*b* are provided instead of the single gantry 22. Portal gantries 22*a*, 22*b* carry transfer containers 6 at the undersides of their bridge portions. Revolving the intersecting portal gantries again causes transfer containers 6** to be moved along a circular path K to any of four stations which in this case are 90° apart.

Figure 7:
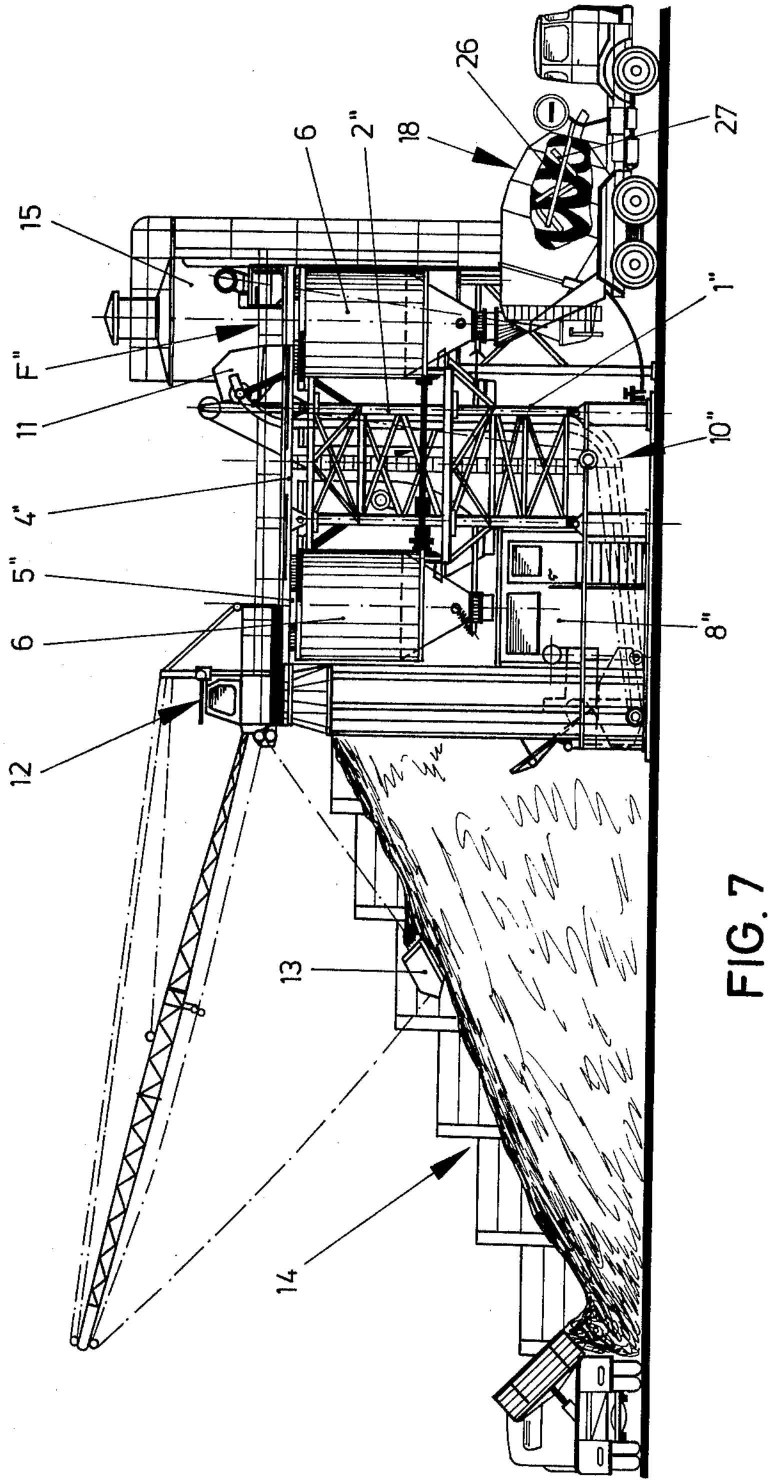
FIG. 7 shows a diagrammatic side view of a further embodiment of the apparatus according to the invention.
Figure 8:
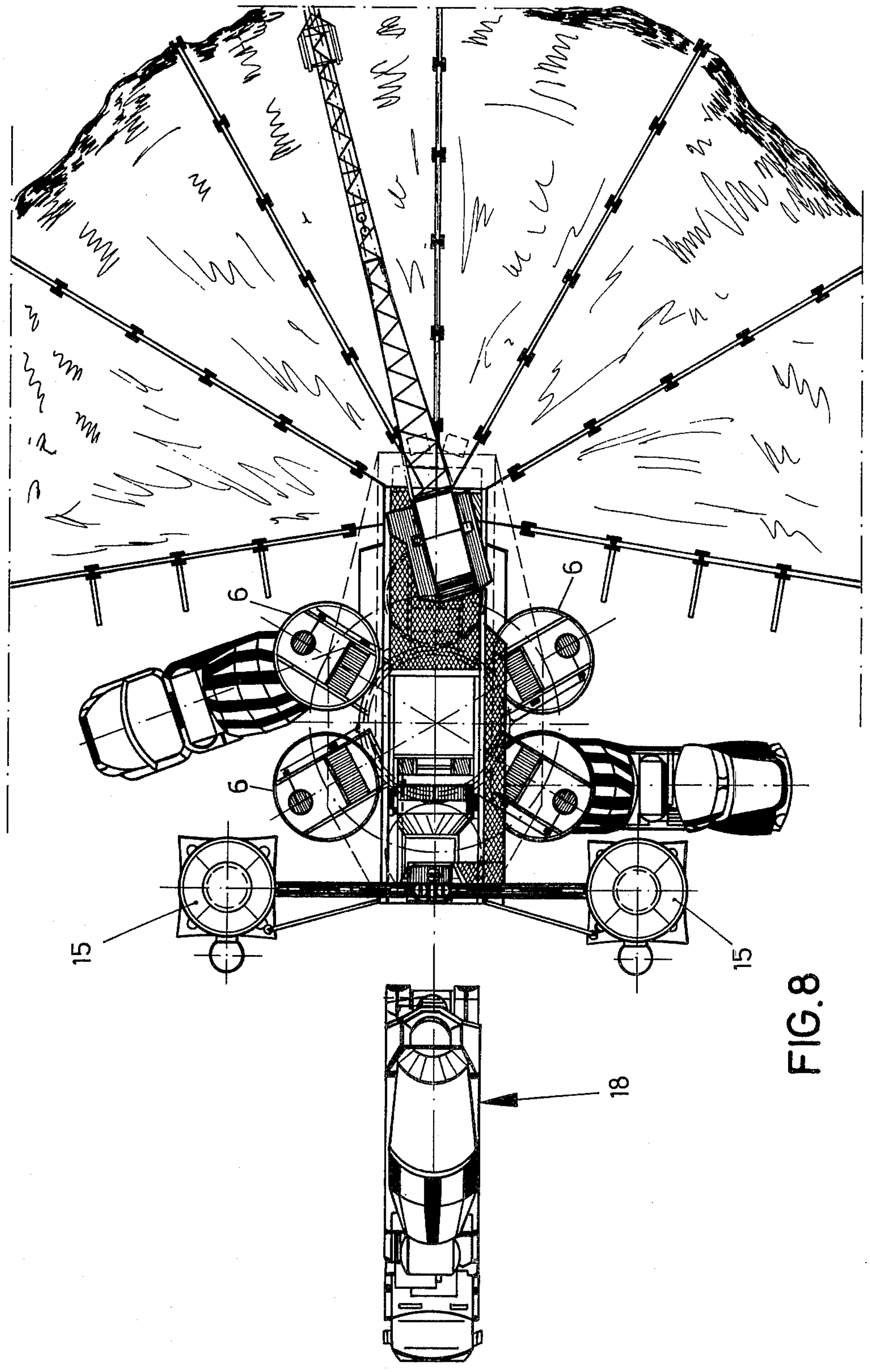
FIG. 8 shows a top plan view of the apparatus of FIG. 7.

In the embodiment of FIGS. 7 and 8, the carrier structure 1" again comprises a central non-revolving tower 2" carrying a revolving arm cross 4" at its upper portion. Arm cross 4" in this embodiment comprises six equi-angularly spaced arms 5" from which transfer containers 6 are suspended. The essential difference between this embodiment and that shown in FIGS. 1 and 2 consists in the elevator 10" for the filler materials extending along the interior of tower 2". The operator's cab 8" has been relocated outside tower 2" and is disposed underneath one of the waiting stations.

Otherwise the various components are again similar to those in FIGS. 1 and 2. In particular, FIGS. 7 and 8 show the cement bunkers 15, the filler material storage space 14, and the dragline device 12 with the dragline bucket 13. The filling station F" in this embodiment is disposed at the side opposite the filler material storage space 14, so that the elevator bucket 11 is guided from the lower end of dragline device 12 radially inwardly into tower 2", upwards through the interior thereof, and outwards at the upper end of the tower towards the opposite side.

Concrete mixer truck 18 in FIG. 7 is shown partially in section, showing a positive mixing tool assembly 27 disposed within the mixing drum in addition to conventional conveying elements 26.

The invention is not restricted to the embodiments shown. In particular, the number of transfer containers supported by the carrier structure may be varied as required. Also, the carrier structure may consist only of a central tower having the transfer containers attached to its sides. It is also possible to support the transfer containers at variable height relative to the tower, either by mounting them on swinging carrier arms or by providing a telescoping tower.

We claim:

1. Apparatus for delivering batches of ready-mixed concrete materials from a bunker to concrete mixer trucks comprising:

a carrier structure including a central tower having a vertical axis and an elevated cross arm structure, said cross arm structure including a plurality of arms extending radially outwardly from said axis of said central tower and angularly spaced apart from each other and said axis at regular angular intervals;

a plurality of transfer containers, at least one transfer container mounted on each of said arms, each transfer container comprising a plurality of separate material storage compartments therein and each container having a closeable outlet at the bottom thereof;

actuating means on said apparatus for operating said outlets;

drive means for effecting rotation of said cross arm structure relative to said axis to move said transfer containers along a closed circular path of movement around said axis between a filling station and a plurality of other stations along said path, including at least one emptying station above a position whereat a concrete mixer truck having positive mixing tools therein can be accommodated, said drive means including indexing means for effecting rotation of said cross arm structure in indexed incremental amounts corresponding to the distance between each adjacent pair of stations;

conveyor means located clear of said circular path of movement of said transfer container and clear of said cross arm structure for conveying material from said bunker to a position above said filling station for delivery to a transfer container thereat;

and an operator's control station including operator-actuated controls connected for operating said conveyor and said drive means.

2. Apparatus according to claim 1, wherein said central tower is nonrotatably mounted and said cross arm structure is rotatably supported by the upper end of said tower, with said transfer containers being mounted at the ends of said arms of said cross arm structure.

3. Apparatus according to claim 1, wherein said carrier structure includes a portal gantry rotatable about said axis and wherein said transfer containers are carried by said cross arm structure which is defined by the horizontal bridge portion of said portal gantry.

4. Apparatus according to claim 3 wherein said portal gantry comprises a single portal, and said transfer containers are carried in pairs at opposite sides of said bridge portion of said portal.

5. Apparatus according to claim 3 wherein said portal gantry comprises intersecting portal structures, and said transfer containers are supported by the bridge portions of said portal structures.

6. Apparatus according to claim 1 wherein said operator's cab is located within said tower.

7. Apparatus according to claim 1 wherein said tower carries said actuating means for operating the outlets of said transfer containers.

8. Apparatus according to claim 1 wherein said elevator extends through the interior of said tower.

9. Apparatus according to claim 1 wherein at least one of said transfer containers comprises a positive mixer device.

* * * * *